United States Patent [19]
Witzel

[11] 3,766,957
[45] Oct. 23, 1973

[54] CLOSURE MEMBER FOR ANTISKID TIRE CHAINS

[75] Inventor: Günter Witzel, Aalen, Germany

[73] Assignee: Eisen-und Drahtwerk Erlau Aktiengesellschaft, Aalen, Germany

[22] Filed: Dec. 8, 1971

[21] Appl. No.: 206,104

[30] Foreign Application Priority Data
Dec. 12, 1970 Germany............. P 20 61 395.0

[52] U.S. Cl. ............................................. 152/242
[51] Int. Cl. ........................................... B60c 27/00
[58] Field of Search................. 152/237, 241, 242, 152/243

[56] References Cited
UNITED STATES PATENTS
3,559,713  2/1971  Mueller et al. .................. 152/243
2,109,068  2/1938  Kinnear ............................ 152/242

*Primary Examiner*—James B. Marbert
*Attorney*—Walter Becker

[57] ABSTRACT

A closure member for a tire chain, and a tire chain comprising a plurality of such closure members, according to which each of the closure members comprises an open ring portion which at its free ends forms an insert opening for the introduction of chain links to be interconnected while at the ends a closure element is detachably arranged which positively extends around the ends and closes the insert opening.

26 Claims, 18 Drawing Figures

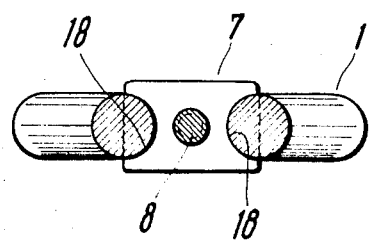
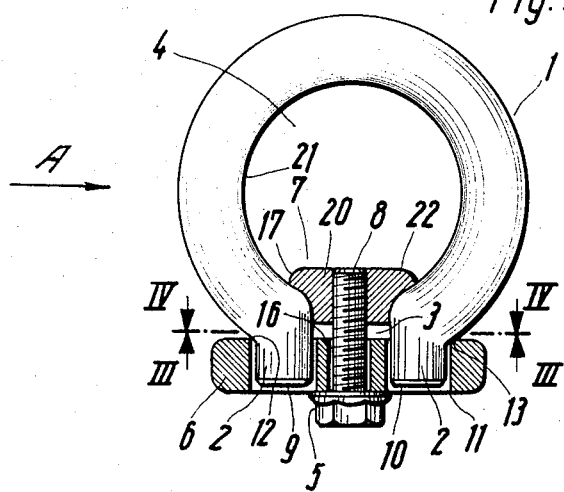
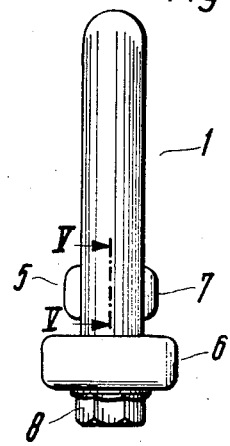
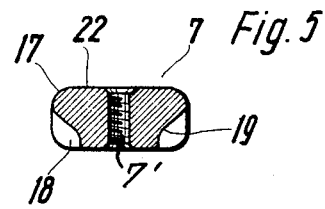
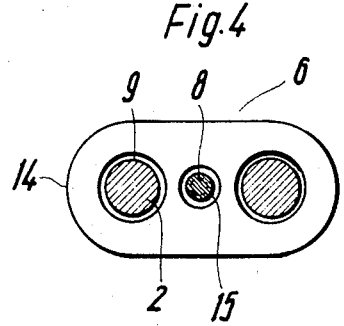
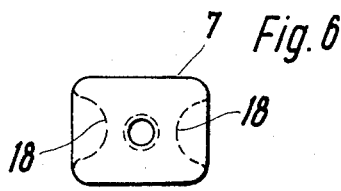

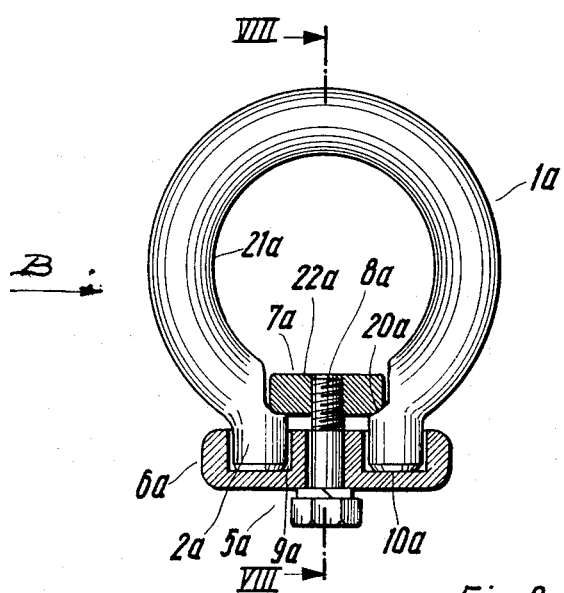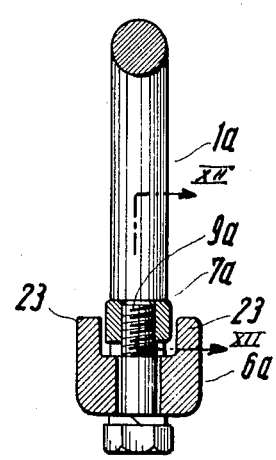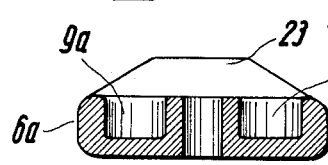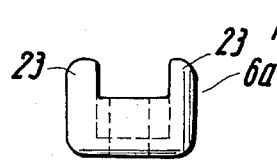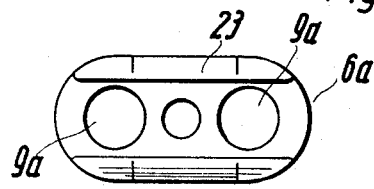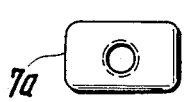

Fig. 17
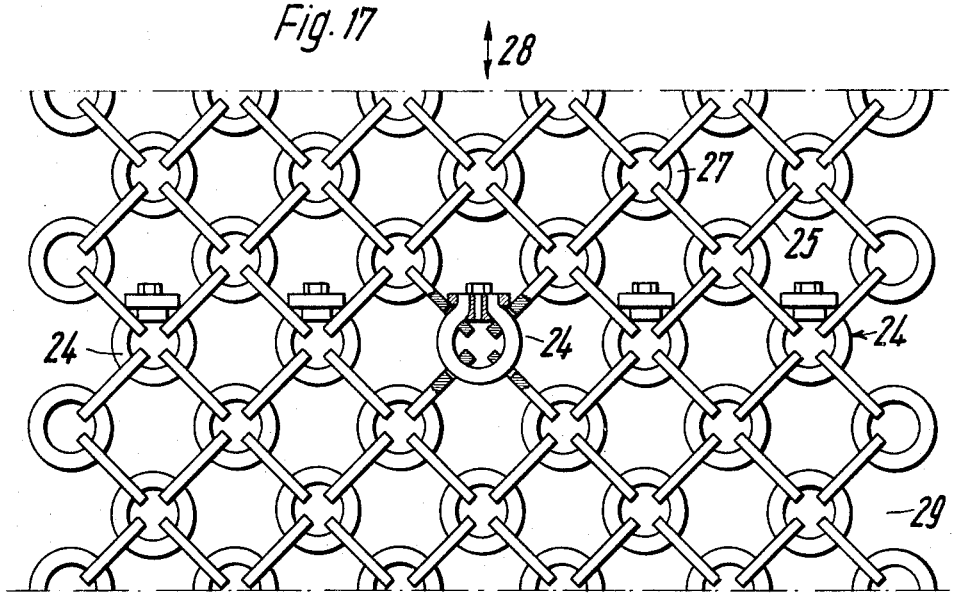
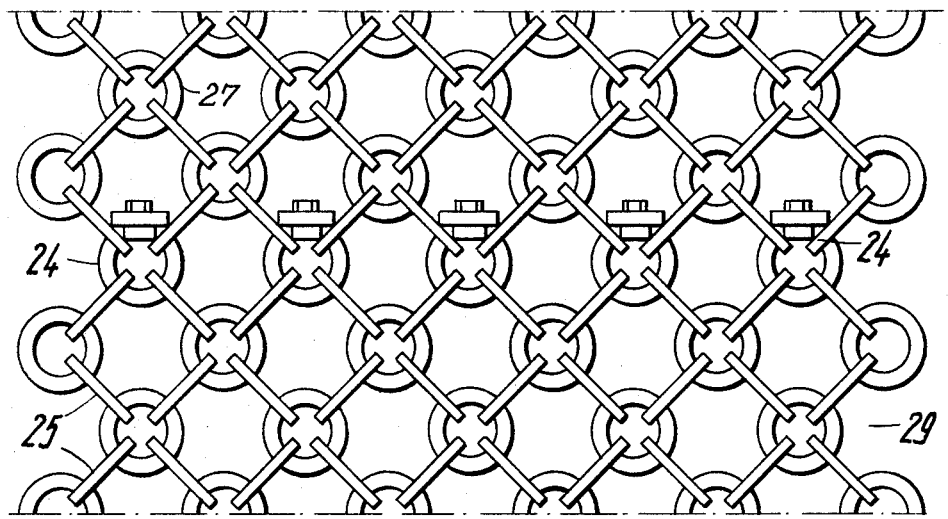

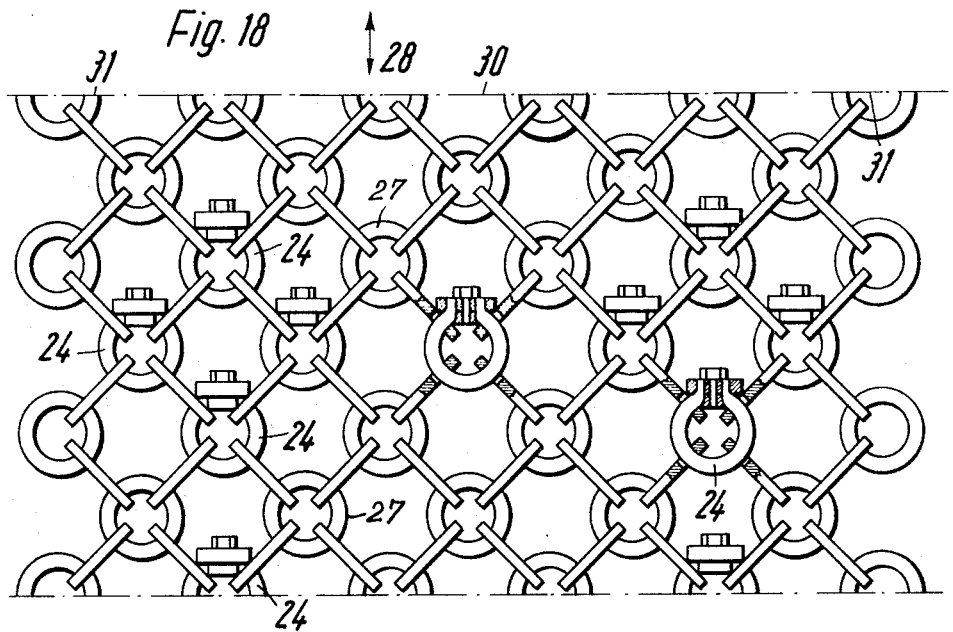
Fig. 18
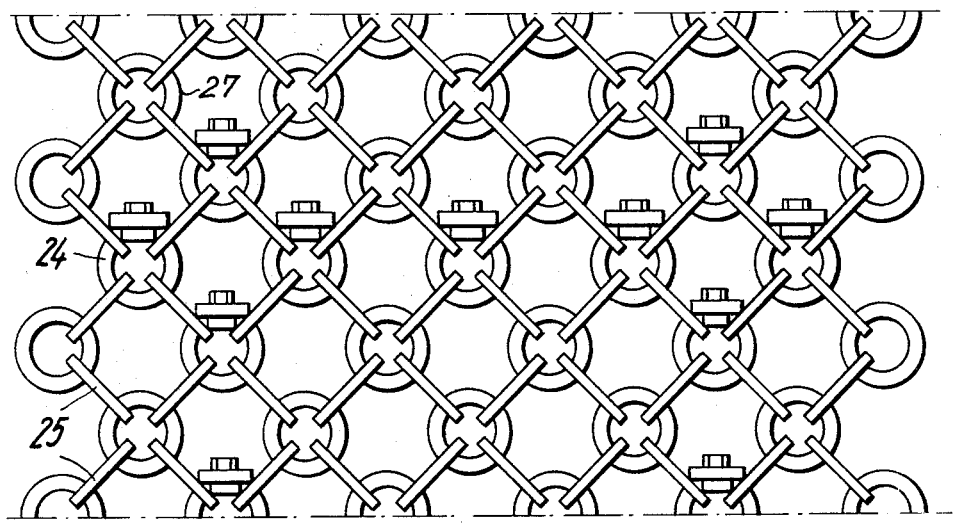

CLOSURE MEMBER FOR ANTISKID TIRE CHAINS

The present invention relates to a closure member for antiskid tire chains. Closure members for antiskid tire chains are intended primarily to receive at least two adjacent links of a tire protective chain of the type involved and to interconnect the links. By arranging closure members adjacent to each other with further links, for instance web links, inserted in the closure members, it is possible to build up a complete tire protective chain. The closure members must be easy to handle and the individual links of the chain must be such that they can easily be inserted into the closure member. After the individual links have been inserted into the closure member, they must be able sufficiently freely to move relative to each other while simultaneously an absolutely safe chain link connection must be assured which is able to withstand the occurring forces. Furthermore, it is necessary that the closure members can easily be replaced in case of repairs.

It is an object of the present invention to provide a closure member for antiskid tire chains which will meet the above outlined requirements.

This object and other objects and advantages of the invention will appear more clearly from the following specification in connection with the accompanying drawings, in which:

FIG. 1 illustrates, partially in section, a closure member according to the invention.

FIG. 2 shows the closure member of FIG. 1 as seen in the direction of the arrow A.

FIG. 3 is a section taken along the line III—III of FIG. 1.

FIG. 4 represents a section taken along the line IV—IV of FIG. 1.

FIG. 5 is a section through the clamping shoe of the closure member according to the invention and represents a section taken along the line V—V of FIG. 2.

FIG. 6 is a top view of the clamping shoe of FIG. 5.

FIG. 7 illustrates partially in section a second embodiment of the closure member according to the invention.

FIG. 8 is a section taken along the line VIII—VIII of FIG. 7.

FIG. 9 shows the holding member of the closure member of FIG. 7.

FIG. 10 is a top view of the holding member of FIG. 9.

FIG. 11 shows the holding member of FIG. 9 as seen in the direction of the arrow B.

FIG. 12 is a section through the clamping shoe of the closure member of FIG. 7, said section being taken along the line XII—XII of FIG. 8.

FIG. 13 is a top view of FIG. 12.

Figure 14:
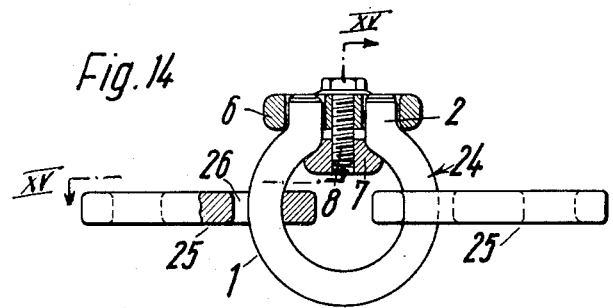
FIG. 14 shows a closure member according to the invention in combination with two web links.

FIGS. 17 and 18 respectively illustrate two further embodiments of chains employing closure members according to the invention.

The closure member according to the present invention is characterized primarily in that it comprises an annular portion having two freely extending legs forming an insert opening for the links to be interconnected while the leg ends have detachably associated therewith a closure member which positively extends around the leg ends of the annular portion and embraces the same.

According to one embodiment of the invention, the closure member is of oval shape having associated therewith a clamping shoe on the inner surface of the annular portion and adjacent to the insert opening, the clamping shoe being connected to the holding element by means of a clamping member, especially a clamping screw. The clamping shoe which at least within the region of its ends is wider than the thickness of the annular portion extends over the annular portion at least partially at the end faces.

Expediently, the clamping shoe is at least at that side thereof which faces toward the holding member provided with concave recesses for engagement with the merging portions between the legs and the adjacent portions pertaining thereto of the annular portion so that the clamping shoe rests over a large surface and over the surfaces forming an angle with each other against the annular portion, while the lateral surfaces of the recesses simultaneously laterally engage the annular portion. The annular portion has a substantially constant cross section, preferably circular cross section, up to the leg ends.

According to a preferred embodiment of the invention, the recesses form pockets which, when considering the cross section at a right angle to the central axes of the two legs, have a U-shaped contour and, when considering the cross section parallel to the central axes, form an obtuse angle so that a very favorable support is obtained and the clamping shoe is secured against unintentional turning.

A particularly simple construction of the closure member is obtained when the clamping shoe is of a parallelepiped shape and preferably has rounded or similar edges whereby also an increased strength will be assured. Advantageously, the recesses extend from that side of the clamping shoe which faces the holding member to the rounded portions or the like of the edges of the oppositely located side so that the inner surface of the clamping shoe which faces toward the center of the closure member merges gap-free with the inner surface of the annular portion in such a way that the chain links connected to the closure member will not be affected in any way as to their movability.

When the width of the clamping shoe is less than the width of the holding member, a contour of the sides of the closure member is obtained which is particularly favorable for engagement with the tire and with the road surface. Especially favorable dimensions are obtained when the thickness of the clamping shoe approximately equals that of the holding member whereby also a low weight of the closure member will be obtained.

According to a further development of the invention, the closure member has passages which serve as plug opening for engagement of the legs of the annular portion the end faces of which preferably are slightly set back relative to that surface of the holding member which faces away from the center of the closure member so that, on one hand, a safe engagement of the holding member with the annular portion and, on the other hand, a protection of the leg ends against wear will be assured. The holding member, however, may also have blind holes as plug opening for engaging the legs of the annular portion.

For purposes of further simplifying the structure of the closure member and in order to obtain small dimensions, the surface of the preferably plate-shaped holding member which faces toward and/or away from the center of the closure member is substantially plane. For purposes of improving the movability of the elements which are arranged adjacent to the closure member, the ends of the holding member are rounded preferably around the axes of the plug openings, especially in a semicircular manner, in order to save the tires.

According to the present invention there is furthermore suggested a closure member, especially of the above mentioned type, according to which the plane inner surface of the clamping shoe which faces toward the center of the closure member has its ends on both sides of the insert opening directly adjacent to the inner surface of the annular portion, so that a continuous merging between the inner surface of the annular portion and the inner surface of the clamping shoe is obtained for assuring a high degree of movability of the further links inserted into the closure member. Expediently, the clamping shoe has its surface which faces away from the inner surface engage stepped shoulders on the inner surface of the legs of the annular portion while the shoulders are offset by the thickness of the clamping shoe so that the, for instance plate-shaped, clamping shoe is countersunk on the inner side of the annular portion.

According to a further feature of the invention, the clamping shoe has at least half of its thickness located between laterally protruding longitudinal webs of the holding member, which webs preferably have rectilinear outer surfaces, so that the clamping shoe will be prevented from accidental turning and will be very well protected against wear.

Referring now to the drawings in detail and FIGS. 1 to 6 thereof in particular, the closure member shown therein comprises an open ring portion 1 which extends over an angle of approximately 300°. The ends or legs 2 of the closure member extend parallel to each other outwardly away from the center of the closure member while the preferably circular cross section of the ring portion 1 is substantially the same from one leg to the other leg. The two legs 2 of the ring portion 1 define therebetween an insert opening 3 for links to be inserted into the closure member so that the inserted links will extend through the opening 4 defined by the ring or annular portion 1 and engage the same.

The insert opening 3 is closed by a closure member generally designated 5 which extends around the leg ends 2 of the ring portion 1 in a positive manner. In the specific embodiment shown in FIGS. 1 to 6, the closure member is formed by a lock which comprises a holding member 6 and a clamping shoe 7 which is adapted by means of a clamping screw 8 to be clamped against the ring portion 1.

The holding member 6 is formed by an oval element which comprises openings 9 for receiving the legs 2. The legs 2 do not extend all the way through the openings 9 but have their end faces 10 located somewhat back of the outer plane surface 11 of the holding member 6. The holding member 6 has its inner marginal zones 12 of the openings 9 rest on the concavely rounded merging sections 13 between the legs 2 and the adjacent zone of the ring portion 1; the end edges 14 of the holding member 6 are semicircularly rounded about the axes of the openings 9. The width of the holding member 6 is only slightly greater than twice the diameter of the cross section of the ring portion 1. Between the openings 9, the holding member 6 is provided with a bore 15 for the passage of a clamping screw 8 adapted from the outside of the holding member to be passed through said bore 15 into a correspondingly threaded bore 7' of the clamping shoe 7. The clamping shoe 7 has that side thereof which faces the holding member 6 provided with pocket-shaped recesses 18 located within the region of the ends of the clamping shoe 7. The recesses 18, when considering the cross section which is parallel to the central axes of the legs 2, have an obtuse angled shape or contour as shown in FIG. 5 and when considering the view parallel to the axes of legs 2 have an approximately semicircular U-shaped contour (FIG. 6) with a diameter which corresponds to the diameter of the cross section of the ring portion 1.

In conformity with FIG. 5, the recesses 18 are in cross section concavely rounded at 19 in such a way that they are adapted to the convexly curved merging portions 20 between the inner surfaces of the legs 2 and the inner surface 21 of the ring portion 1, said inner surfaces of legs 2 and inner surface 21 of the ring portion 1 facing each other. The recesses 18 extend from that side which faces the holding member 6 to approximately the rounded edges 17 on the oppositely located side 22. In view of the just described design, the clamping shoe 7 extends not only between the legs 2 but also slightly into the receiving opening 4. The lateral confinements of the recesses 18 as well as the legs 2 and also the adjacent zone of the ring portion 1 and the merging sections laterally, i.e. at the end faces of the ring portion 1, extend approximately over the entire thickness of the clamping shoe 7. The inner surface 22 of the clamping shoe 7 merges through the pertaining rounded edges 17 directly with the inner surface 21 of the ring portion 1.

Referring now to the embodiment illustrated in FIGS. 7 to 13, the clamping shoe 7a of the lock 5a rests on shoulders 20a on those inner sides of the legs 2a which face each other. The recesses in legs 2a forming the shoulders 20a have a height which approximately equals the thickness of the plate-shaped clamping shoe 7a in such a way that the ends of the inner surface 22a of the clamping shoe 7a through slight gaps directly merge with the inner surface 21a of the ring portion 1a. The inner surface 22a of the clamping shoe 7a could be concavely curved around the center axis of the ring portion 1a so that the inner surface 22a would form a direct continuation of the inner surface 21a. However, in view of the short length of the clamping shoe 7a, in most instances also a plane inner surface 22a will suffice for obtaining the same effect.

The openings 9a in the holding member 6a of the lock 5a for receiving the legs 2a are formed by blind bores. The end faces 10a of legs 2a rest against the bottom surfaces of the blind bores 9a. The longitudinal sides of the holding member 6a are provided with longitudinal webs 23 which in mounted condition extend in the direction toward the clamping shoe 7a by a distance equalling more than half the thickness of the clamping shoe 7a. According to FIG. 9, the longitudinal webs 23, when seen from the side, are trapezoidal so that their upper edge sections which are parallel to the plane of the holding member 6a have a length which corresponds approximately to the length of the clamping shoe 7a. The free distance between the longitudinal webs 23 is only slightly greater than the width of the clamping shoe 7a. The width of the clamping shoe 7a is only slightly greater than the thickness of the ring portion 1a.

Figure 15:
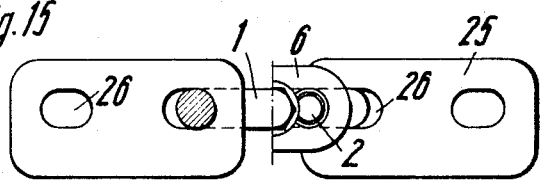
FIG. 15 is a top view, partially in section, of the arrangement according to FIG. 14, said section being taken along the line XV — XV of FIG. 14.

As will be seen from FIGS. 14 and 15, the ring portion 1 of a closure member 24 according to the invention may engage two adjacent web members 25 arranged linearly one behind the other. The web members 25 are plate-shaped and each has two flat oval receiving openings 26 for engagement with the pertaining closure member 24. The receiving openings 26 extend in the longitudinal direction of the web members 25 which are provided as running links which in mounted condition of the chain will contact the ground.

Figure 16:
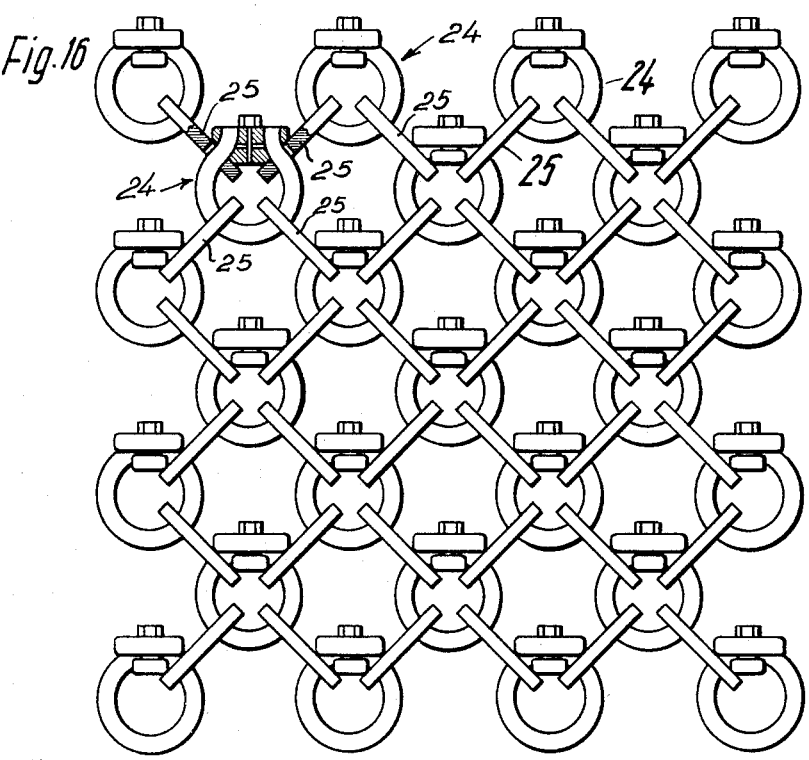
FIG. 16 is a cutout of a chain employing closure members according to the invention and shows the same in view.

The tire chain illustrated in FIG. 16 is built up exclusively of web links 25 and closure members 24 interconnecting the same. The chain has such a net-like configuration that four web links 25 arranged at a right angle with regard to each other engage one closure member 24 each, whereas two closure members 24 engage two members 25. In view of this design an exchange of any desired link of the chain will be possible.

As will be seen from FIG. 17, the net-like running portion of the tire chain may also be formed by sections 29 which are arranged one behind the other in the longitudinal or running direction as indicated by the arrow 28. The section 29 are interconnected by closure members 24. The remaining connecting members of the web links 25 are formed by ordinary completely closed ring elements 27. It is also possible to provide closure members 24 in a single transverse row only so that the closure members 24 serve only for opening or closing the chain.

According to the embodiment illustrated in FIG. 18, the running portion 30 of the tire chain is provided with detachable lateral parts 31 so that, for instance, the running portion 30 can be exchanged. The lateral portions 31 are connected to the running portion 30 by means of the closure members 24. According to the embodiment of FIG. 18, the running portion is formed by sections which in the running direction indicated by the arrow 28 are located one behind the other and are detachable from each other. Similarly, also the respective lateral portion 31 may be formed by sections which in the running direction indicated by the arrow 28 are located one behind the other and are detachable from each other. As will furthermore be seen from FIGS. 16 to 18, all closure members 24 are aligned in the same manner so that the legs of all ring portions point in one of the two possible running directions indicated by the arrow 28.

It is, of course, to be understood that the present invention is, by no means, limited to the particular showing in the drawings but also comprises any modifications within the scope of the appended claims.

What I claim is:

1. A closure member for tire anti-skid chains, which includes: an open ring portion with a leg at each end extending in a direction away from said ring portion, said legs being spaced from each other and defining therebetween a single insert opening for inserting chain links into said ring portion, and closure means surrounding said legs and detachably closing said insert opening in tensioned engagement with said legs at ends thereof especially in a direction of a connection line between the leg ends with a tension force component 2. A closure member according to claim 1, in which said closure means includes a longitudinal holding member having portions receiving said legs, and also includes clamping shoe means engaging said ring portion from the inside thereof near the region of said legs and being detachably connected to said holding member.

3. A closure member according to claim 2, in which the clamping shoe means has those portions thereof which face toward areas where the legs merge with the respective adjacent areas of the ring portion provided with concave recess means for engagement with the ring portion surfaces where the legs merge with respective ring portion surfaces.

4. A closure member according to claim 1, in which the ring portion between said legs has a substantially constant circular cross section.

5. A closure member according to claim 3, in which said recess means in the plane perpendicular to the central axes of said legs has a U-shaped cross section, and in the plane substantially parallel to the plane through said central axes said recess means are partially defined by surfaces forming an acute angle with each other.

6. A closure member according to claim 2, in which the width of said clamping shoe means is less than the width of said holding member whereas the thickness of said shoe means approximately equals the thickness of said holding member.

7. A closure member according to claim 2, in which the portions receiving said legs are bores extending all the way through said holding member, the end face of each of said legs being slightly located back of that outer surface of said holding member which is located opposite to but faces away from said shoe means.

8. A closure member according to claim 2, in which the portions receiving said legs are formed by blind holes in said holding member.

9. A closure member according to claim 2, in which the end portions of said holding member are substantially semicircularly rounded.

10. A closure member according to claim 2, in which that surface of the shoe means which faces toward the center of curvature of said ring portion is approximately plane and has its end areas substantially in alignment with the respective adjacent inner surface portion of said ring portion.

11. A closure member according to claim 2, in which those surfaces of said legs which face each other are each provided with a step-shaped shoulder for respectively receiving an end portion of said clamping shoe means therein.

12. A closure member according to claim 11, in which said holding member has two longitudinal sides located opposite to each other provided with longitudinal webs, and in which the clamping shoe means in mounted position protrudes beyond said webs in the direction toward the center of curvature of said ring portion by approximately half the thickness of said clamping shoe means.

13. A closure member according to claim 12, in which said webs as seen from the longitudinal sides of said holding member have a trapezoidal contour.

14. A tire chain comprising closure members and web links engaging said closure members, each of said closure members being engaged by at least two web links and including an open ring portion with a leg at each end extending in a direction away from said ring portion, said legs being spaced from each other and defining therebetween an insert opening wider than the width of said web links for insertion thereof into said ring portion, each of said closure members also including closure means surrounding the pertaining legs and detachably closing said insert opening.

15. A tire chain according to claim 14, in which within the range of the joint area of the ends of the tire chain and extending over the entire width of said tire chain there are provided closure members having interlocked therewith two web links of one end and two web links of the other end of the tire chain.

16. A tire chain according to claim 14, in which the running section of the tire chain is divided into at least two longitudinal portions interconnected by at least some of said closure members.

17. A tire chain according to claim 14, in which each running section and the lateral section of the tire chain is divided into at least two longitudinal portions interconnected by at least some of said closure members.

18. A tire chain according to claim 14, in which the lateral section of the tire chain is divided into at least two longitudinal portions interconnected by at least some of said closure members.

19. A tire chain according to claim 14, having a running section and two lateral sections and merging sections by means of which the lateral sections merge with said running section, and closure members arranged within said merging sections and over the entire length of said chain so that each closure member interconnects two web links of the running section and also interconnects two web links of a lateral portion.

20. A tire chain according to claim 19, in which the running section is at least primarily built up of web links and the pertaining closure members interconnecting same.

21. A tire chain according to claim 19, in which the running section and the lateral sections are built up primarily of web links and the pertaining closure members interconnecting same.

22. A tire chain according to claim 19, in which the lateral sections are built up primarily of web links and the pertaining closure members interconnecting same.

23. A tire chain according to claim 14, in which each closure member includes a clamping shoe engaging the pertaining ring portion at the inside thereof and being detachably locked to the pertaining closure means, said clamping shoes extending in the longitudinal direction of the tire chain.

24. A tire chain according to claim 14, in which all closure members are arranged substantially parallel to each other.

25. A closure member according to claim 1, in which said legs of said ring portion have rounded-off engagement surfaces of ends located away from each other, said closure means having a braced engagement directly with respective rounded-off engagement surfaces free of any play that would permit movement and wear.

26. A closure member according to claim 25 in which said closure means is longitudinally plate formed having inner edge zones furthest away from each other engaging said surfaces of said leg ends.

* * * * *